Figure 1:
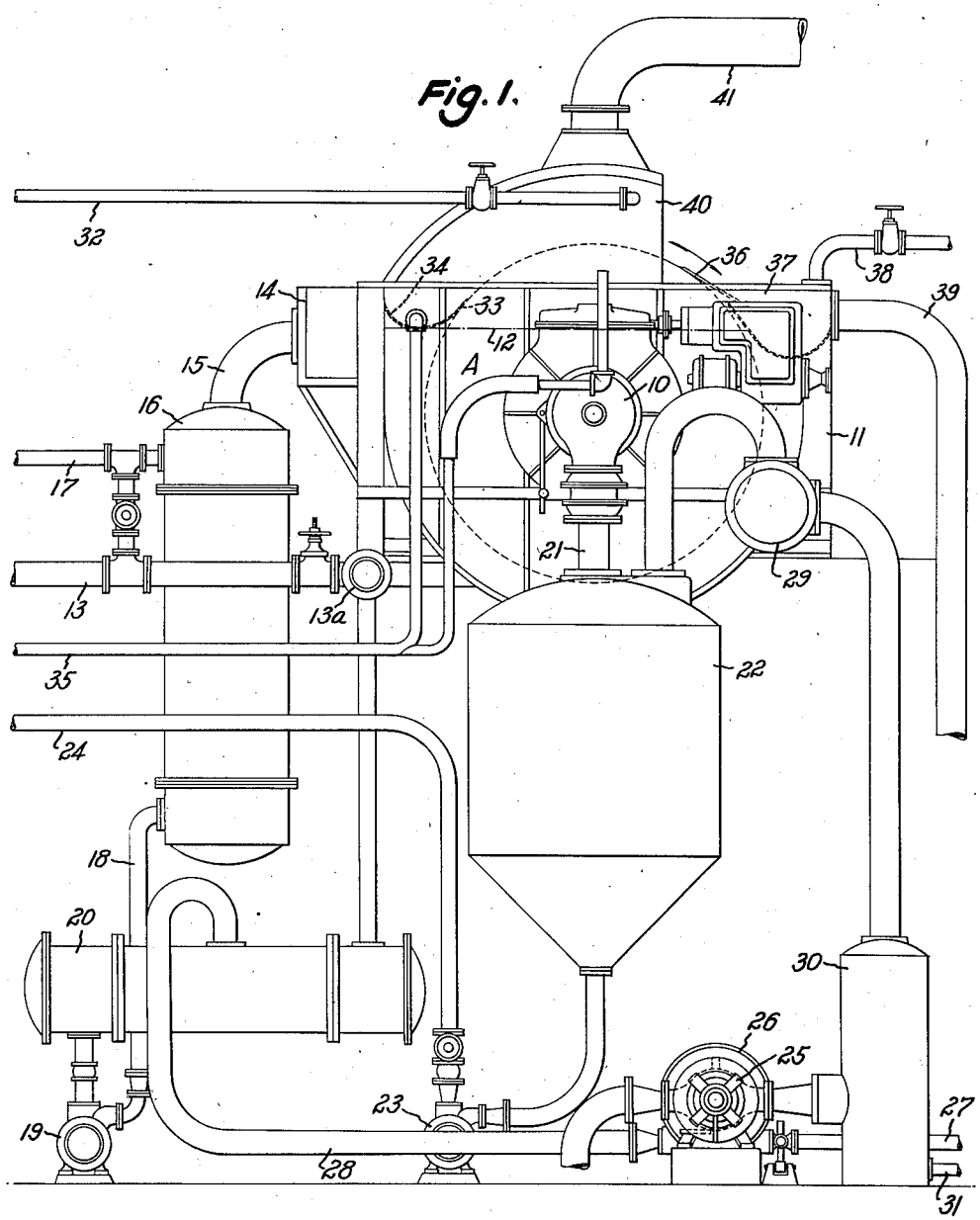

Patented May 16, 1944

2,348,846

UNITED STATES PATENT OFFICE 2,348,846

PURIFICATION OF SUGAR JUICES

Clarence J. Peterson, Salt Lake City, Utah, assignor to The Eimco Corporation, Salt Lake City, Utah, a corporation of Utah Application May 22, 1940, Serial No. 336,674

4 Claims. (Cl. 127—51)

This invention relates to the purification of sugar juices and the like, and is particularly directed to the clarification or filtration of sugar juices, for example, beet and cane sugar juices, which have been treated to cause a precipitation, coagulation or flocculation of impurities contained therein, for example, by treatment of the juice with lime and subsequently carbonating the limed juice.

A principal object of the invention is the provision of a process and apparatus whereby suspended solids may be removed from sugar juice with a maximum recovery of sugar values and a minimum expenditure of labor and material.

A further object of the invention is to provide a process and apparatus whereby sugar juices which have been subjected to treatment causing the formation of suspended solids are subjected to direct continuous filtration without the interposition of any intermediate settling, clarification or other treating step.

A further object of the invention is the provision of process and apparatus for the rapid continuous filtration of treated sugar juices whereby the time elapsing between treatment of the sugar juice and its evaporation is greatly shortened and the loss of sugar values due to chemical reactions and decomposition.

Another object of the invention is to provide a process and apparatus whereby sugar juices which have been treated by the so-called "continuous carbonation" process may be continuously filtered and substantially all the sugar values removed from the separated solids in a single continuous operation.

The methods of removing precipitated solids from sugar juices heretofore utilized have involved a number of serious disadvantages.

Filtration of the juices in filter presses or other high pressure, discontinuously operating pressure-type filters has involved comparatively high losses of sugar in the filter cake because of the fact that the pressure used in the filtration crushes and compacts the cake to such an extent that washing of the cake is inefficient. Moreover, these filters involve intermittent operation with high labor costs and frequent and expensive filter medium replacements.

To avoid the high loss of sugar values in the cake, it has been proposed to allow the treated sugar juice to stand in a suitable sedimentation apparatus, clear juice being drawn off at the top and the settled solids or mud being subjected to continuous filtration and washing. This method, however, involves large losses of sugar arising from chemical reactions and decomposition during the relatively long period of time required for the sedimentation, particularly the reactions leading to the formation of "lime salts" and inversion.

The clarification of the treated sugar juice in tube or sock-type thickeners also involves a long delay between treatment and evaporation due to the slow juice velocities and large storage space in filters of this type, with resulting large losses of sugar values due to reaction and decomposition. The operation of filters of this type is also expensive due to the numerous sock replacements required and the large amount of time lost in this complicated and difficult maintenance.

The invention provides for the first time a process in which the whole of the treated sugar juice is continuously filtered at high velocity and in which both cake losses and reaction and decomposition losses are very greatly reduced.

The process of the invention comprises continuously filtering sugar juices containing suspended solids, for example, limed and carbonated beet sugar juices, at high velocity and low pressure directly from the treating operation. The process makes possible the direct and efficient washing of the solids in the same operations, although the repulping of the filter cake and filtration of the repulped cake in a further operation, when desirable, can be effected without in any way delaying the velocity of passage of the greater portion of the sugar juices from the carbonation treatment to the evaporators. The invention also includes a more effective method of washing the filtered solids, increasing the recovery of sugar values and also increasing the rate of flow of the sugar juices through the filtration operation by reducing the proportion of filter surface required for the washing.

The invention further comprises the removal of suspended solids from sugar juices and the like by passing the entire juices without intermediate settling or classification and preferably at a temperature in the neighborhood of the boiling point of the juice, through an endless rotary filter medium suspended in a body of the juice, preferably to such an extent as to immerse the greater portion of the filter medium, under a differential pressure not exceeding one atmosphere, while continuously rotating the filter medium at a rate which submerges the entire filter area in the body of the juice at least once per minute and continuously washing the solids on the emerging filter surface, preferably by means of a blanket of wash liquid extending over approximately half of the unimmersed filter area in a quantity in excess of the amount which will pass through the surface under the pressure used, and continuously removing the washed solids from the filter surface prior to the resubmergence thereof.

The invention will be more particularly described for the purpose of illustration with reference to the accompanying drawings showing, by way of example, the application of the principles of the invention to the so-called "continuous carbonation" process for the purification of sugar juices. In the drawings, Fig. 1 is a diagrammatic representation in elevation of apparatus embodying the principles of the invention; and Fig. 2 is a flow sheet of a typical method of operation embodying the principles of the invention.

Figure 2:
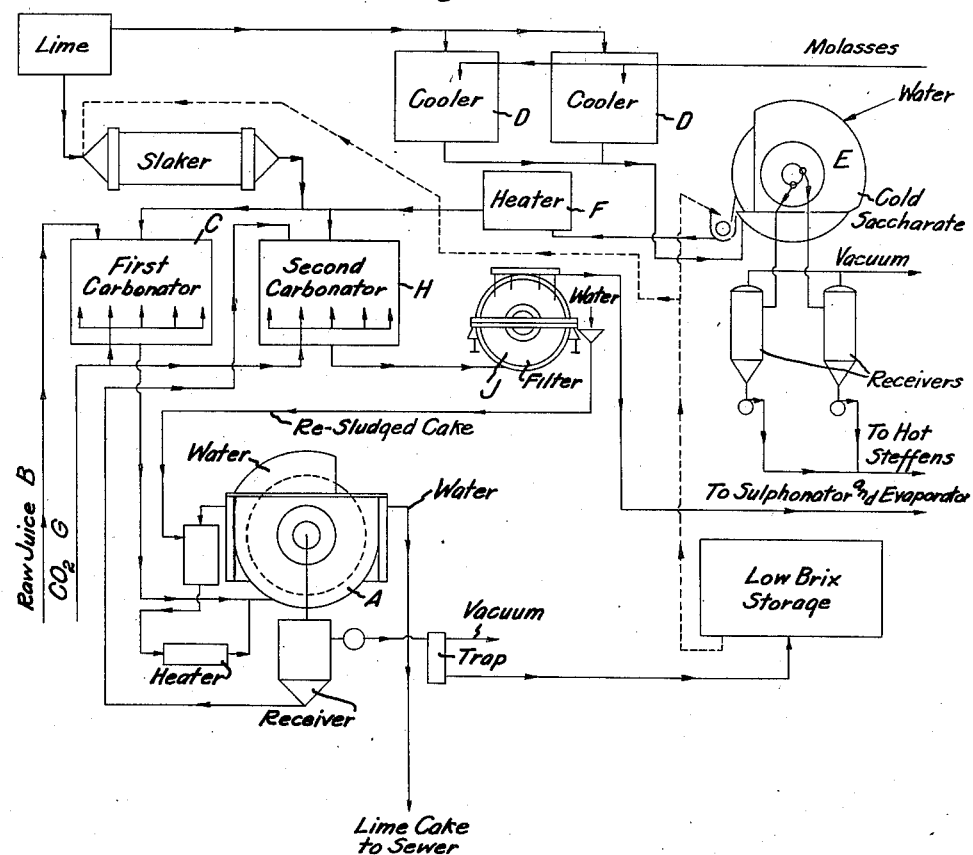

The central and characteristic feature of Fig. 1 is the filter indicated at A. This is shown, for purposes of illustration, as a rotary drum filter, although other types of low pressure continuous filters, such as rotary disc filters, may also be used.

The filter shown consists of a rotating drum formed of a plurality of longitudinal peripheral sections supporting a suitable filtering medium, such as cotton twill, and draining through internal pipes to rotary valve 10 in the manner well known in the filter art and represented, for example, by the filter known as the "Oliver-continuous filter." However, for the purpose of the present invention, it is desirable that the peripheral supporting grids, the connecting pipes and the manifold be of large size and shaped to handle a large volume of flow with a minimum of turbulence, and the filter and tank are designed as shown to provide a maximum of submergence of the filter surface used and to operate at temperatures approaching the boiling points of the solutions.

The drum is mounted for rotation in filter tank 11, in which the treated sugar juice to be filtered is maintained at the high level indicated at 12. The sugar juice is conducted directly from the treating operation to the filter tank through pipe 13.

The level in filter tank 11 is maintained at the predetermined high level 12 by means of overflow box 14, the overflow passing through pipe 15 to a vertical heat exchanger 16 wherein it flows over tubes into which sludge separated from the second carbonation stage is fed through pipe 17. This sludge is then mixed with the overflow from the filter tank, the mixture flowing through pipe 18 to pump 19 by which it is pumped through heater 20 to inlet header 13a which communicates with feed line 13 and filter tank 11.

The filtrate from filter A passes through rotary valve 10 and pipe 21 to vacuum receiver 22 from which it is pumped by pump 23 through pipe 24 to the second carbonation stage. The relatively small amount of air required to be pumped to maintain the desired low pressure differential at the filter is handled by wet vacuum pump 25 driven by steam turbine 26. The turbine is supplied with steam by pipe 27 and the exhaust steam is conveyed by pipe 28 to heater 20 where it serves to heat the combined second-stage carbonation sludge and overflow from filter tank 11. The cooler 29 and trap 30 remove entrained liquid and excess moisture from the air passing to pump 25. The condensate is returned from 30 to low brix storage through pipe 31.

A characteristic feature of the invention is the relatively low differential pressure upon the cake in the filtering and washing sectors. In no case does this pressure exceed one atmosphere and, in general, it has been found that a vacuum equivalent to about nine inches of mercury is the most satisfactory pressure for maximum filtering capacity and effective washing.

The deep submergence of the filtering surface in the method and apparatus of the invention is a further characteristic feature which has already been referred to and is an important factor in obtaining the low pressure, high velocity filtration characterizing the invention. The velocity of rotation of the rotary filter element is maintained sufficiently high that the total filtering area is submerged at least once a minute.

The proportion of filter surface submerged and the speed of rotation correlated therewith to obtain the preferred submergence rate, and thereby the desired high rate of filtration, will vary with different types of sugar juices and suspended solids and with the amount of washing area required to obtain effective area. I have found, however, the greatly increased washing efficiency, with concomitant decrease in required washing area and corresponding increase in effective filtering area and rate of filtration, can be effected by supplying the wash water in the form of a sheet or blanket extending over the whole of the wash area. In this way, entire surface area of the washing zone is continuously utilized at the highest possible efficiency.

This method of washing is most readily effected by supplying an excess of wash water in the form of a blanket over the washing zone and the filter of the invention is therefore preferably provided with means for removing the excess wash water without diluting the juices being filtered. For example, in the apparatus shown by way of example in Fig. 1 of the drawing, the wash water is supplied, in substantial excess of the capacity of the washing sector, at somewhat to the left of the top center of the filter surface by means of pipe 32. The wash water passes down over the cake in a blanket completely covering the cake throughout the washing area, the excess wash water being directed by flexible diversion member or dam 33 into trough 34 whence it is carried away by pipe 35, for example, to the second carbonation step, for use in resludging the separated solids. By this method, it has been found that sugar values may usually be substantially completely removed from the cake obtained by the high velocity, low pressure filtration method of the invention in a zone of the filter surface of the order of 10 to 20% of the total filter surface.

The wash water which passes through the cake flows into receiver 22 with the filtrate, although all or any desired portion of the wash water may be diverted to a separate receiver by suitable arrangement of the rotary valve 10, as is well known in the filtering art. The washed cake is removed from the filter surface by doctor blade 36 and directed into repulping box 37 wherein it is repulped with water from pipe 38. The repulped slurry is carried to the sewer by pipe 39.

The top of the filter is preferably enclosed in a vapor hood 40 and exhaust pipe 41 to carry vapors from the tank and filter to a suitable exhaust device.

The flow sheet of Fig. 2 is an illustrative embodiment of the application of the principles of the invention to a continuous carbonation process for the purification of sugar juices.

In the process illustrated in the flow sheet, raw sugar juice from B flows into first carbonator C where it is mixed with milk of lime, advantageously provided by mixing slaked lime with sugar-containing liquors recovered from molasses in apparatus indicated by coolers D, filter E and heater F. Carbon dioxide from G passes into the carbonator and the slurry flows to filter A, the constructional features and operation of which have been more particularly described with reference to Fig. 1. Filtrate from filter A is returned to second carbonator H where it is subjected to further treatment with milk of lime and carbon dioxide. The slurry from the second carbonator flows to filter J, which because of the small amount of cake and because of its difficult filtering characteristics must be filtered on a plate and frame filter press, a Kelly filter or the like. The filtrate from J passes to the sulphonator and evaporator, not shown, while the filter cake is resludged with water and returned to the filter A with the slurry from first carbonator C.

This flow sheet clearly shows some of the advantages of the invention, particularly in that the clarifier and clarifying operation prior to the filtration operation, as shown for example, in U. S. Patent 1,685,118 to Campbell, is eliminated, thereby not only effecting a substantial saving in capital investment, floor space and maintenance, but also very greatly reducing undesired chemical reactions and decompositions in the treated juices.

It will be seen that the invention is not restricted to the particular example shown by way of illustration, but that it may be applied broadly to the removal of suspended solids from sugar juices and that any type of apparatus may be used which conforms to the principles of the invention as defined in the appended claims.

I claim:

1. In the purification of sugar juices by liming and carbonation thereof the improvement which comprises passing the entire carbonated juice directly through a section of continuously moving endless filter medium under a differential pressure equivalent to about nine inches of mercury and at a temperature in the neighborhood of the boiling point of the juice, continuously washing the filtered solids upon said medium, and continuously removing the washed, filtered solids from said medium.

2. In the removal of suspended solids from sugar juices by passing the juice through a section of a continuously moving endless filter medium and continuously removing the deposited solid from said medium, the step which comprises supplying to the surfaces of the deposited solid, intermediate the deposition and the removal thereof, an amount of washing liquid in excess of the amount capable of passing through the deposited solid under the pressure upon the deposited solid.

3. The method of removing suspended solids from sugar juices which comprises causing the entire sugar juice to pass under a differential pressure not exceeding one atmosphere through a section of a continuously moving endless filter medium, continuously washing the filtered solids upon said medium by supplying to the surface of the filtered solids an amount of washing liquid in excess of the amount capable of passing through the solids under said pressure, and continuously removing the washed, filtered solids from said medium.

4. The method of removing suspended solids from sugar juices which comprises suspending an endless rotary filter medium in said juices while maintaining the temperature of said juices not substantially below the boiling point thereof, applying a differential pressure less than one atmosphere to the opposite faces of said medium, and rotating said medium at a rate to submerge the whole of the filtering area thereof at least once per minute.

CLARENCE J. PETERSON.